United States Patent
McCotter et al.

(10) Patent No.: US 6,401,097 B1
(45) Date of Patent: Jun. 4, 2002

(54) SYSTEM AND METHOD FOR INTEGRATED DOCUMENT MANAGEMENT AND RELATED TRANSMISSION AND ACCESS

(76) Inventors: Thomas M. McCotter; Michael T. Shannon, both of 1000 S. Fremont Ave., Suite. 5129, Alhambra, CA (US) 91803

( * ) Notice: Subject to any disclaimer, the term of this patent is extended or adjusted under 35 U.S.C. 154(b) by 0 days.

(21) Appl. No.: 09/235,177

(22) Filed: Jan. 22, 1999

Related U.S. Application Data

(60) Provisional application No. 60/072,290, filed on Jan. 23, 1998.

(51) Int. Cl.⁷ .............................................. G06F 17/00
(52) U.S. Cl. ...................... 707/102; 707/200; 707/104; 707/1; 345/764; 345/866
(58) Field of Search ................................ 707/104, 102, 707/200, 1; 345/764, 866

(56) References Cited

U.S. PATENT DOCUMENTS

| | | | | |
|---|---|---|---|---|
| 5,668,966 A | * | 9/1997 | Ono et al. .................... | 345/356 |
| 5,794,006 A | * | 8/1998 | Sanderman .................... | 707/1 |
| 5,819,261 A | * | 10/1998 | Takahashi et al. .............. | 707/3 |
| 5,831,606 A | * | 11/1998 | Nakajima et al. ............ | 345/362 |
| 5,877,765 A | * | 3/1999 | Dickman et al. ............ | 345/394 |
| 6,018,744 A | * | 1/2000 | Mamiya et al. ............. | 707/104 |

* cited by examiner

*Primary Examiner*—Hosain T. Alam
*Assistant Examiner*—Cam-Y Truong
(74) *Attorney, Agent, or Firm*—O'Melveny & Myers LLP

(57) ABSTRACT

A data management system and method is provided for creating, viewing, and interacting with object metadata directly from a computer system's operating system. In a preferred embodiment, an object profile is defined by selecting metadata fields, such that at least one metadata can be supplied to correspond with each metadata field. The metadata corresponding to each object can then be viewed by interfacing directly with the computer's operating system. The viewing of metadata can further be customized by selecting at least one metadata field within the operating system, such that metadata corresponding to an object and the at least one metadata field is displayed. The metadata fields and the metadata can further be used to search for objects stored on the computer system, either locally or remotely. The resulting objects can be retrieved and scaled to be displayed on the computer system's output device, regardless of whether the objects comprise single or multiple files.

14 Claims, 6 Drawing Sheets

```
typedef struct
{
    DWORD dwPrev;
    DWORD dwLess;
    DWORD dwMore;
    DWORD dwParent;
    DWORD dwFirstChild;
    DWORD dwFileID;
    char cName [MAX_PATH];
} ELEMENT_STRUCT
```

```
typedef struct
{
    DWORD dwFileID;
    DWORD dwFilePosition;
} FILE_INDEX_STRUCT;
```

SYSTEM AND METHOD FOR INTEGRATED DOCUMENT MANAGEMENT AND RELATED TRANSMISSION AND ACCESS

CROSS-REFERENCE TO RELATED APPLICATIONS

This application claims the benefit of U.S. Provisional Application No. 60/072,290 filed Jan. 23, 1998.

FIELD OF THE INVENTION

The present invention relates generally to file and data management systems and methods, and more particularly, to an improved document management system and method that is integrated into a computer's operating system.

BACKGROUND OF THE INVENTION

Document management tools aid users in storing, retrieving, analyzing, and searching for documents within a computer system. Available through these document management tools are tabular data containing information on a selected document, including the date of creation, name of the creator, description of the document, and file number. By looking at such tabular data, often referred to as the document's profile or metadata (data about data), users can quickly get information about a particular document without having to open it. Such tabular data may further contain information not included in the document itself. SoftSolutions, Worldox and PC-Docs are examples of these types of document management tools.

One drawback in present document management tools, however, is that they are stand-alone application programs operating on top of a computer's operating system. Therefore, users cannot access nor view profiles of documents created by these tools outside of the tools themselves. That is, access directly from the operating system or from other applications is not possible. Such access might be desirable, however, in a case where the tool becomes inaccessible. Furthermore, the speed of accessing files increases considerably if done directly from the operating system. Incorporating document management tools directly into the operating system has the added advantage of reducing additional training costs since users will already be familiar with the operating system look and feel. Additionally other applications running on the operating system can access and share the data generated by the integrated document management system.

Another drawback of existing document management systems is that they are typically limited to management of documents consisting of a single file. These systems are therefore unable to properly manage a "document" which consists of a single image but is physically stored as multiple files.

Consequently, there is a need for an improved method and system for managing documents.

SUMMARY OF THE INVENTION

The present invention, therefore, provides an improved document management system and method that overcomes the disadvantages and drawbacks identified above. The document management system and method disclosed herein provides all the benefits of a document management tool directly integrated with a computer's operating system, and will allow a user to specify unique profile data and will incorporate "objects" consisting of multiple files. Such system and method will facilitate efficient storage, retrieval, analysis, reporting, and searching of documents of all kinds, whether created within the user's computer system or not, and wherever located.

DETAILED DESCRIPTION OF THE INVENTION

Figure 1:
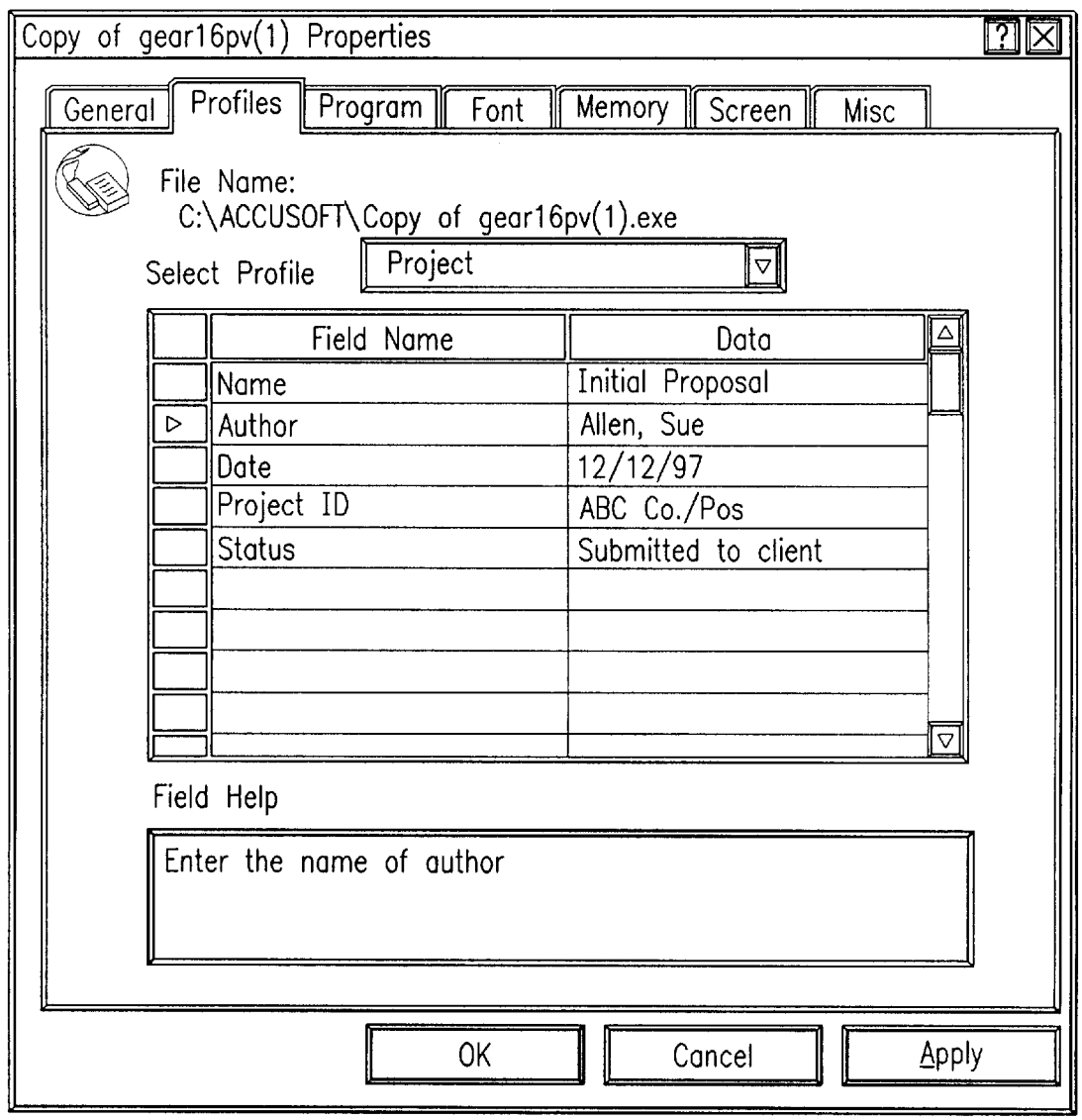
FIG. 1 is an illustration of an exemplary Profile or Metaview Page screen.

The document management system in the preferred embodiment, referred to hereinafter as the DATech System, enables the access and manipulation of "objects" within the operating system. Although the preferred embodiment is described in reference to Microsoft's Windows operating system, it will become apparent to one skilled in the art that modifications may be made for other operating systems without departing from the spirit and scope of the invention. For example the DATech System could easily be implemented in Mac OS, Sun OS, Unix, Linux or other standard operating system platforms.

Definitions

Before continuing with the detailed description, several definitions of the terms used throughout the description are provided as follows:

An "object" is the basic unit that the system manages. An object in the preferred embodiment falls into one of the following three categories: native format documents, unitized image documents, and reference objects, each described in further detail below. Each object in the system may have data (e.g. Document Type, Date, Author, Project ID and Status) associated with it.

"Native format documents" are those documents that are created by any computer application and stored as a single computer file. For example, in a presently preferred embodiment, native format documents include, among others, word processor, spreadsheet, database documents and/or other data files.

"Unitized image documents" are multi-page image documents that are stored on the computer system in multiple files but are represented as a single logical document in the document management system. For example, in a presently preferred embodiment, the individual pages of a multi-page contract that are separately scanned into a document management system and stored as distinct files may collectively comprise a unitized image document as the entire contract is represented, to a user, as a single logical document.

A "reference object" is a computer file that can be used as a reference or placeholder to something that cannot be easily stored as a computer file. The content of the actual computer file has no special significance. Profile data, however, that is associated with the file can be used to store tabular data relating to the object. For example, an automobile might be an exhibit in a court trial. By creating a reference object to reference the automobile, the automobile may be listed on an exhibit list report generated by the system.

"Metadata" is the sum of data associated with an object. Metadata is comprised of information stored in user-defined fields that is associated with the objects in the system. Metadata fields are typically created to contain a particular type of data (e.g. Document Type, Date, Author, Project ID and Status). Some metadata fields can contain multiple data elements per object. For example, a "CC:" or "Recipient" field could have several different names.

A "profile" or "metaview" is a pre-defined collection of metadata fields. An object's profile provides a view of all or a subset of metadata fields. The system can have many profiles defined. Each profile consists of a list of metadata fields, their order in the profile, and guidelines governing the content of each field. Every object has a default profile.

The DATech System

The DATech System embodying the present invention allows users to create and view object metadata directly from the operating system. The DATech System handles all objects, regardless of whether they are native format documents, reference objects or unitized image documents, in a uniform manner. The DATech System further uses metadata fields for other document management functions, including searching, reporting, and object tracking. The DATech System additionally allows for convenient remote storage and access of objects, including unitized image documents that may consist of several physical files, though the use of List Information Servers (LISs). Finally, the DATech System incorporates a system which allows for significantly faster transmission of computer data by scaling the detail of the data (e.g. image resolution) to the ultimate output device.

In the preferred embodiment, shell extensions to the Windows operating system are created which allow a user to gain access to object metadata through any standard operating system tool such as the Windows Explorer. A computer that has these shell extensions loaded can access and view metadata relating to any object stored on that computer or any other computer in the network. These shell extensions provide the system with several document management functions.

Profile or Metaview Page

A Profile or Metaview Page option allows a user to select the profile that he or she wants to view for a selected object. The user has the ability to create different profiles for different objects. When the object is viewed within a folder the metadata associated with that object, corresponding to the selected profile is also displayed.

A user with proper authority can view, modify, add or delete metadata for an object from the Profile Page. The Profile Page option is accessible to the user by selecting the Profile tab of the object's Windows property sheet. FIG. 1 is an illustration of a Profile Page screen. The metadata associated with the selected profile is displayed in a tabular format on the Profile Page. In FIG. 1 the user has specified a profile consisting of five metadata fields: Name, Author, Date, Project ID and Status. The corresponding values for these five fields are: Initial Proposal, Allen Sue, 12/1297, ABC Co./Pos, and Submitted to Client. When the object associated with the profile of FIG. 1 appears in a folder the specified metadata will also be displayed.

Folder Layout

A Folder Layout option provides a method of defining an alternate view of a folder's content. In a typical Windows folder, the user selects the "Detail" view to see the type, date, and size of the documents in a folder. The user does not have the choice of alternate views. Within the DATech system's Folder Layouts option, however, the user may select different views of a folder's content by selecting the metadata fields to be displayed. For a selected profile, the user is presented with a list of available metadata fields. The user chooses from this list to create the view he or she desires for any Windows folder.

Figure 2:
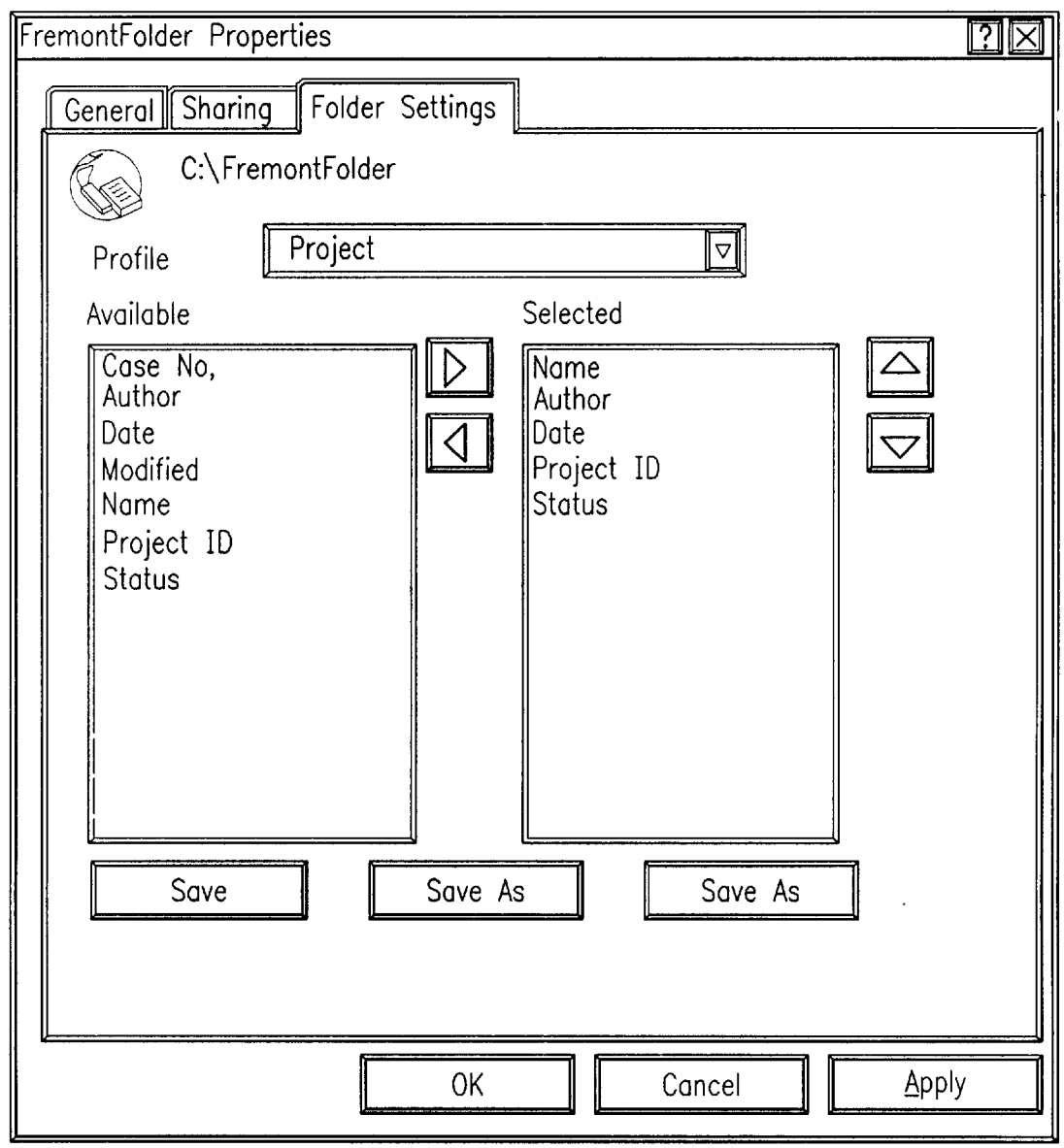
FIG. 2 is an illustration of an exemplary Folder Settings screen.
Figure 3:
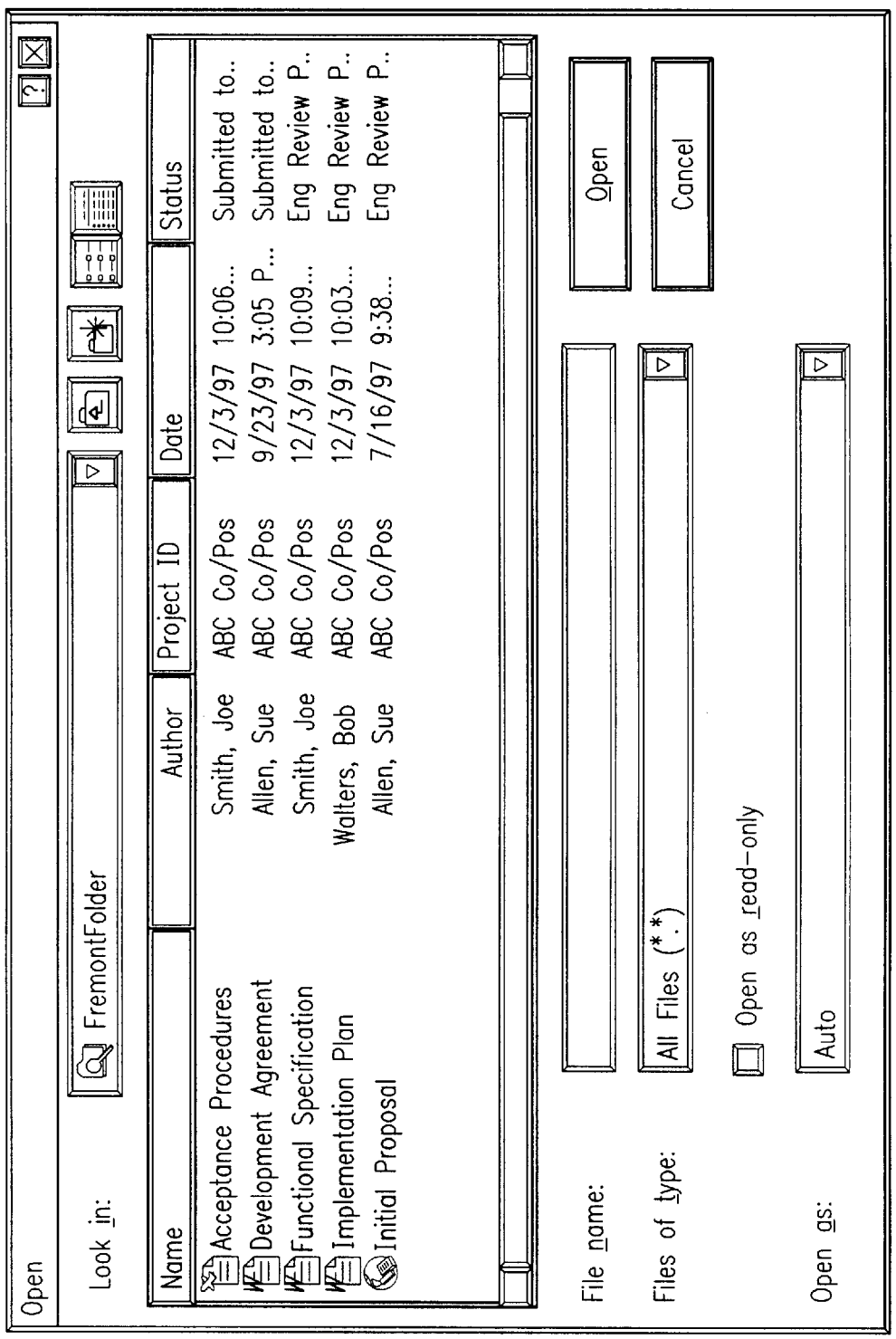
FIG. 3 is an illustration of a folder layout after selection of the Folder Settings shown in FIG. 2.

FIG. 2 is a sample screen of an alternate Detail view selection for an exemplary folder titled FremontFolder. As shown here, only the Name, Author, Date, Project ID, and Status fields have been selected for viewing from the metadata fields available for all the profiles in the system. FIG. 3 illustrates the contents of the exemplary folder according to the view selected in FIG. 2.

The Folder Layout option allows for a more sophisticated searching and sorting of objects or documents. The metadata can also be printed or exported if desired. The Folder Layout option is accessible by selecting a Folder Settings option from the object's property sheet.

Dynamic Content Folder

The DATech System also includes a Dynamic Content Folder ("DCF"). This is a special type of folder that the user can add for a full text or metadata search of the objects in the system. When a DCF is created, the user specifies a search criterion comprising Boolean logic expressions that include metadata fields, text, or numbers. When a user views the content of a DCF, only the documents that meet the search criteria are displayed. These documents are represented in the DCF as "shortcuts" because they provide only links to the original documents. The original documents may physically exist on the user's computer, somewhere on the user's network or at some remote location accessible to the user via the internet. A DCF can also have a defined Folder Layout. The combination of the Folder Layout and DCF provide a means to generate an ad-hoc report by allowing the user to define both a search criterion and a layout.

The contents of a DCF are updated each time that it is accessed. Therefore, if new objects are added to the system that correspond to the selection criteria of a DCF, these objects will appear in the DCF the next time that the DCF is accessed. Objects may also dynamically move from one DCF to another based on specified criteria such as elapsed time. For example a user could configure one DCF (DCF_30) to capture all invoice objects which are between one and thirty days overdue and configure another DCF (DCF_60) to capture invoice objects which are between thirty and sixty days overdue. Through the passage of time an invoice object will move from DCF_30 to DCF_60.

Searching

The DATech System further allows the search of metadata as well as full-text searches aside from the context of DCFs. An entire database or any restricted subset thereof, may also be searched by the system.

All container objects (disks, network connections and folders) have an added "Search" option on their "context menus." A context menu is the menu of options that is presented when a user selects a container file in the Windows operating system. Similar processing is present in most other operating systems. In other operating systems, context menus may be accessed through icons, or may even be launched as a separate application. Upon selecting the Search option, a dialog box is displayed which allows the user to use Boolean logic together with metadata fields to conduct a search of objects in the system. The user can access objects identified by the search directly from a dialog box that displays the results of the search.

Linking the Metadata to the Object

Figures 4, 5A, 5B:
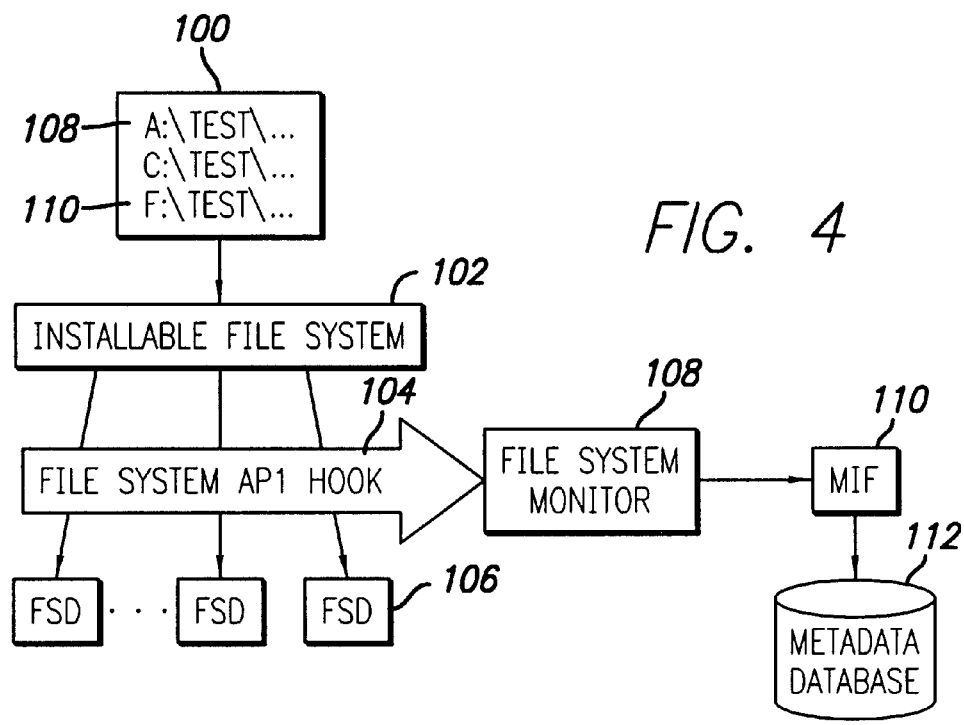
FIG. 4 is a block diagram of the system's Index Binding Mechanism.
FIG. 5A is an illustration of a structure utilized to represent an object in a Media Index File.
FIG. 5B is an illustration of a structure in a Reverse Index File.

Referring to FIG. 4, the DATech System's index binding mechanism provides an absolute link between contents and metadata in a Metadata Database 112 and objects in the system. A File System Monitor ("FSM") 108 implements the index binding mechanism.

To understand the FSM's functionality, a description of the Installable File System ("IFS") 102 is appropriate. The IFS 102, resident in the Windows operating system, provides a common view and access to all the objects within the computer system regardless of where these objects reside. A similar IFS mechanism is available in most other operating systems. Thus, as seen in block 100, objects stored in the floppy disk A: 108 are referenced and accessed in the same way as the objects stored in the network server F: 110. When the user or an application makes any change to the file system, the IFS 102 determines which file system driver ("FSD") 106 is needed to carry out the instruction and passes all necessary data to a specific FSD 106.

The FSM 108 is a static Windows Virtual Device Driver that monitors file system activity. The FSM installs a File System Application Programming Interface ("API") Hook 104 between the IFS 102 and all Windows FSDs 106. When the IFS 102 passes data to a specific FSD 106, the FSM 108, by means of the File System API Hook 104, intercepts the instruction and evaluates its effect on the file system. If the FSM 108 determines that the instruction will effect an object's name or location within the operating system, the event is logged and changes are made to the system's Media Index File ("MIF") 110.

MIF 110 is a file containing information necessary to link metadata with objects in the file system. In a preferred embodiment, each object is represented in the MIF 110 as a node in a binary tree comprising a structure like the one shown in FIG. 5A. The "cName" field of this structure contains the object's long file name in the file system. The "dwFileID" field contains the object's unique ID, and is used to link the object with data in the Metadata Database 112.

The remaining fields represent numeric values that represent offsets from the beginning of the MIF 110. "dwPrev" indicates the location of the node's binary tree parent; "dwLess" and "dwMore" indicate the location of the node's binary tree children; "dwparent" indicates the location of the node's file system parent; and "dwFirstChild" indicates the location of the node's first file system child, and applies only if the object is a directory.

When a node is deleted from the MIF 110, all the fields of the structure are set to NULL except for "dwLess" and "dwMore." The values in these fields are used for "Previous" and "Next" values in a linked list of available nodes. When a new file is added, the node whose values have been set to NULL is used before the file length is extended. During optimization, nodes at the physical end of the file are moved into the empty nodes, and the file length is truncated.

A reverse index file ("RIF") (not shown) serves as a reverse index to the MIF 110. The RIF contains one entry for each node in the MIF 110. Each entry has two components as seen in FIG. 5B. The "dwFileIF" field serves the same function as in the MIF. The "dwFilePosition" field serves as an offset from the beginning of the MIF of the node that represents the particular dwFileID. Because dwFileIDs are always created sequentially, a binary search of the RIF may be conducted to locate a particular FileID and MIF offset. As nodes are deleted from the MIF, the values in the RIF are also set to NULL. The RIF file is likewise compacted periodically, removing NULL values and truncating the file length.

Object Management

Figure 6:
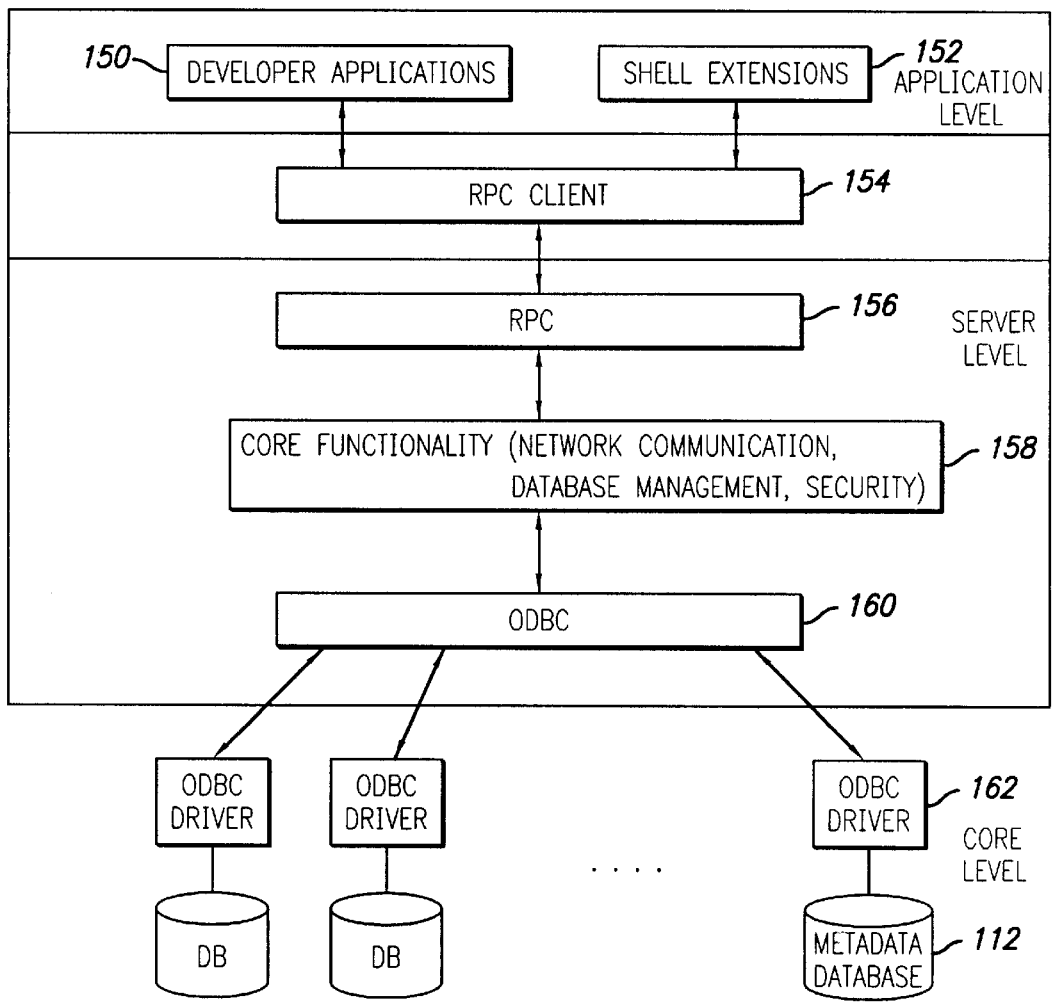
FIG. 6 is a block diagram of the system's document management platform.

FIG. 6 is an illustration of the DATech System's object management platform. The overall architecture of the system is such that a competent computer programmer can easily create his own user interfaces and applications that can efficiently and safely work with the objects in the system.

Developer applications 150 and shell extensions 152 on the application level provide simplified secure access to the core functionality of the system by providing dynamically loaded libraries that export several C++ classes. By utilizing these classes, an application level programmer can quickly and easily gain access to the complete functionality of the document management system, and may further create his or her own document management applications. In the preferred embodiment, the "Mailslots" computer program handles network communication for document management.

Multi-part Imaged Documents

The system described so far assumes that each object is either a native format document or a reference object.

The DATech System, however, is also able to manage non-native documents, which are scanned into the system, as well as other multi-part image documents, in the same manner as native format documents or reference objects are managed.

Multi-part image documents are documents, which, often due to their size, are not efficiently accessible or efficiently manipulated by a computer. The present system, therefore, represents multi-page image documents as "unitized image documents." Unitized image documents are multi-page image documents that are stored on the computer system in multiple files but are represented as a single logical document in the document management system. Although existing technology allows image documents stored in multiple files to be represented as a single logical document, a separate program running on top of the operating system is required to access and manipulate these documents. In the preferred embodiment, unitized image documents are as accessible to the user as native format documents by using the system's Unitized Image Viewer, which provides a means of viewing, printing, creating and modifying unitized image documents directly from the operating system.

Unitized Image Viewer

Figure 7:
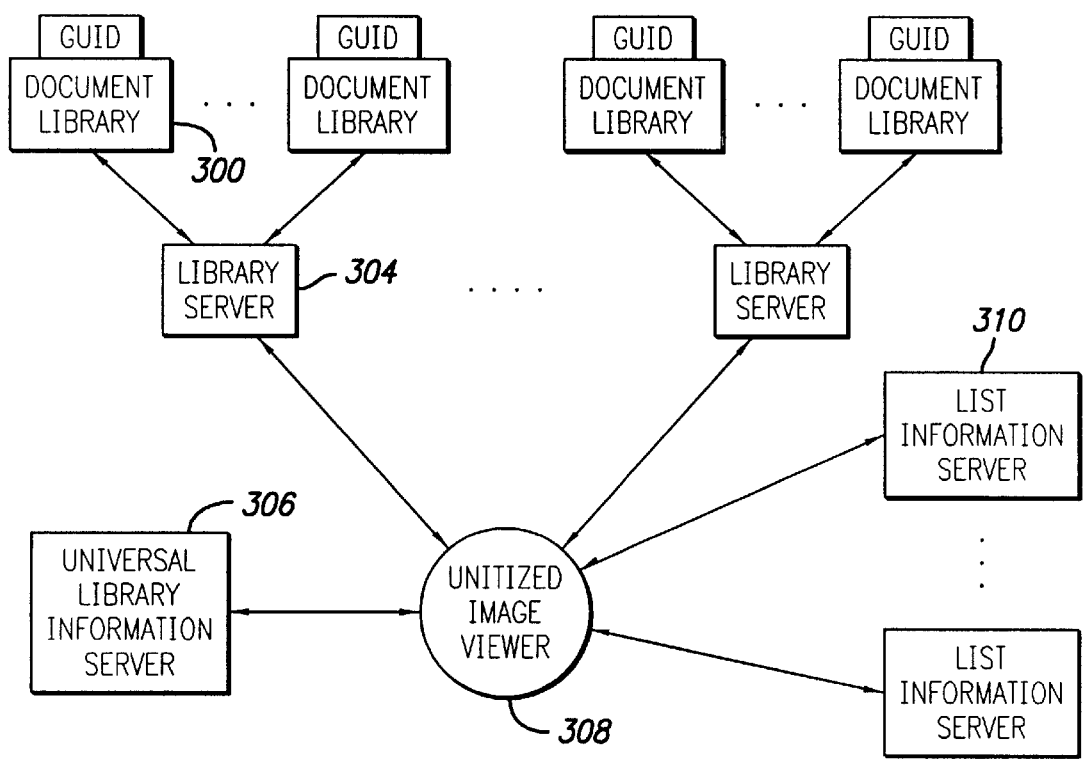
FIG. 7 is a block diagram of components for accessing unitized image documents.

FIG. 7 is a block diagram illustrating the Unitized Image Viewer and the various servers it communicates with. A Document Library 300 contains a collection of image files stored on computer media and a series of database tables that describe the relation of the images to one another.

Specifically, the database tables describe the use and order of specific files that together represent individual logical documents.

A Library Server 304 reads and manages data contained within a Document Library 300. A Library Server 304 can simultaneously manage multiple Document Libraries.

The system's Unitized Image Viewer 308 uses data in an Transient Resource Locator (TRL) file to reference a document in a Document Library 300. Other tools or applications may also use the data in the TRL file to access image documents.

Contained within an TRL is a Library GUID (Globally Unique Identifier) field, Document ID field, and Secure Key field. These three items are described in more detail below.

A Library GUID is a series of numbers and letters that together form a universally unique reference to a Document Library 300. Each Document Library 300 has a GUID assigned to it, and every TRL file that represents a document within that Library has the Library's GUID contained within it.

The Document ID refers to a single logical document in a library. Thus, a particular logical document may be identified by a unique Library GUID along with its Document ID.

A Secure Key is a four-byte integer that is randomly generated when the document is created. This number is stored in the Document Library 300 as well as the TRL file. Comparing the TRL Secure Key with the Library Secure Key ensures that an TRL file and its contents are authentic.

A TRL file is completely portable. This means that if the TRL file is copied, e-mailed or transferred to any other computer, it can still be used to retrieve and view a document. This is accomplished by a link resolution method. Under this method, a Viewer 308 uses an TRL file to locate and establish communication with a Library Server 304.

The link resolution method makes use of List Information Servers (LIS) 310 to obtain a directory to the Library Servers 304. When the Viewer 308 opens an TRL file, it reads the Library GUID. The Viewer then attempts to contact the Library Server 304 at its last known location. If it is unable to make contact, it contacts a LIS 310 server to which it "subscribes" and requests the information necessary to establish communication with the Library server 304 that is servicing the Document Library 300. Such information includes details on the protocol, endpoint, and network address. The Viewer 304 might subscribe to several LIS Servers 310 to increase the chances of finding information about the Document Library 300. The Viewer 304 subscribes to an LIS server by listing itself as a user of that server. If the first LIS Server 310 is unable to provide the required information, the Viewer 304 contacts the next LIS server 310 to which it subscribes.

When a Library Server 304 begins servicing a Document Library 300 it "publishes" this fact by listing itself as the server which is servicing the particular Document Library. If the LIS Server 310 was previously listing the Document Library 300 as being serviced by a different Library Server 304, that information is removed and replaced with the new information. The Library Server 304 further publishes information necessary to establish a network connection with the Library Server 304 (e.g. protocol, endpoint, and network address). If the server supports multiple protocols, it publishes information about each network protocol as well as its preference about which protocol to use when making contact.

A Library Information Server may interact with another Information Server to gain information about a Library for which it is unaware. This interaction between information servers may be hierarchical or flat, depending on the requirements of a specific computing environment. A single Universal Library Information Server (ULIS) 306 is available through the Internet. The ULIS serves as the root of the hierarchical implementation as well as a shared Information Server that can be directly accessed in a flat implementation. Therefore, if all Library Servers 304 and all Viewers 308 publish and subscribe to the ULIS 306 or a server in the ULIS hierarchy, then TRL files gain universal portability.

One of the unique advantages of an TRL file is its minimal size, in comparison to the underlying file or data. As a result of the relatively small file size of a DocLink (a specific type of TRL for documents) (e.g. 24 bytes), hardware devices with limited storage and connectivity resources can store and manage a vast number of these TRLs. Since TRLs can be easily passed between devices via infrared links or other less-robust forms of connectivity, they allow for convenient and remote access to a correspondingly vast amount of information. An exemplary implementation of this technology allows for a hand-held computer, PDA, or other device to transmit via an infrared link a DocLink file to a desktop computer that is attached to a larger network. The desktop computer could then use its network connection and display/print resources to retrieve and present the document represented by the DocLink file to the user of the handheld computer.

Retrieving Images Using Variable Resolution

In the preferred embodiment, the system makes use of a wavelet based compression and decompression algorithm. Wavelet based compression and decompression algorithms facilitate efficient and expeditious transportation of unitized image documents across networks. In a presently preferred embodiment, the DATech system makes use of the WAVEPAC algorithm which, is an industry standard wavelet based compression algorithm developed by Ricoh, Inc. Other compression and decompression algorithms, which facilitate the system's ability to manage image documents stored in remote locations, may be utilized in alternative embodiments. Additionally, algorithms such as WAVEPAC can be optimized for specific applications of the system.

Image files that are compressed and stored using the WAVEPAC algorithm can be read to meet particular spatial resolution and pixel depth requirements. Displaying a file at a resolution less than at which it was scanned requires that only a fraction of the file be transferred to the computer that is running the Viewer 308. The resulting transfer time is reduced proportionately. Other resolution dependent files such as audio, video or multimedia files can be transferred in varying "resolution" using algorithms similar to WAVEPAC.

When the Viewer 308 requests a page from the Library Server 304, it also provides its resolution requirements for the current display device. The Library Server 304 only sends enough of the file to meet the requested resolution requirements. This aspect of the system is referred to as WYNIWYG (pronounced winnie-wig) or "what you need is what you get."

Frequently requested files are maintained in the system's cache. If the Viewer 308 requests a file that it has already received to meet a lower resolution requirement, the Library Server 304 only sends the additional portion of the file required to meet the higher resolution.

The Viewer utilizes a Weighted Caching algorithm to determine which files to store in the cache. This algorithm calculates a file's "weight," defined as: Weight=bytes required for this access+(bytes required for all previous accesses * Reduction Constant).

The Reduction Constant is a floating-point value that can vary from 1 to 0 depending on whether the likelihood of a file to be reused is optimistic (1) or pessimistic (0).

In the preferred embodiment, network communication for unitized image applications is handled through a Remote Procedure Call (RPC) implementation, which a standard of the Open Software Foundation. The use of RPC, however, is not essential to the operation of the system. Other network communications software such as Winsocket could be used. As illustrated in FIG. 6, RPC allows functions to be declared in a client application 154, while the actual implementation is performed in the server application, 156. This allows for robust functionality across non-heterogeneous networks. For instance, a command in one of the shell extension to retrieve data from the Metadata Database, 112 may be structured as RetrieveData(path, doc_name, client). The RPC client 154 calls the RetrieveData function in the server application 156. In processing this call, the server application 156 accesses the core functionalities of the computer system 158, among which is database management. The computer system makes use of the ODBC (Open Database Connectivity) API to access different databases through a common set of commands. The ODBC API determines which database it must access and passes the required data to the appropriate ODBC driver 162. Once information from the database has been retrieved, the information is returned to the application level. The specific use of ODBC is not essential to the operation of the system. Other software acting as a translator between different database engines could be used in place of ODBC.

While various embodiments of this invention have been illustrated and described, it will be understood that the foregoing is merely illustrative of the principles of the invention, and that various modifications can be made by those skilled in the art without departing from the spirit and scope of the invention as defined by the following claims. For example, the system may be an extension of any operating system that allows the handling and viewing of files and file profiles. The screens can also be reformatted to change their appearance. Additionally, although the preferred embodiment utilizes shell A-=extensions and a Viewer to allow a user to access objects directly from the operating system, other means may be employed to perform the same task in alternative embodiments. Furthermore, although the system and method have primarily been described in relation to document management, those skilled in the art will realize that other types of computer data and files (audio, video, multimedia, etc.) may also handled by the present invention. It is, therefore, to be understood that within the scope of the appended claims, this invention may be practiced otherwise than as specifically described.

What is claimed is:

1. A method for managing objects in a computer system having an operating system, said method comprising the steps of:

interfacing directly with a standard operating system tool to store at least one metadata corresponding to a stored object, wherein said standard operating system tool is an extension of said operating system's shell;

defining a profile corresponding to said stored object by a user interfacing directly with said standard operating system tool to select at least one metadata field adapted to receive said at least one metadata;

supplying said standard operating system tool with said at least one metadata after said at least one metadata field has been selected; and accessing said at least one metadata corresponding to said object by interfacing directly with said standard operating system tool.

2. The method of claim 1, wherein said standard operating system tool is selected from a group consisting of a property sheet and a windows explorer.

3. The method of claim 1, wherein the step of supplying said at least one metadata further comprises linking said metadata with said stored object.

4. The method of claim 1, wherein said stored object is stored in a location selected from a group consisting of a local location and a remote location.

5. The method of claim 4, wherein said stored object is selected from a group consisting of a native format document, a unitized image document, and a reference document.

6. The method of claim 1, wherein said step of defining said profile further comprises selecting said at least one metadata field from a group consisting of document type, document name, date, author, project identification, and status.

7. The method of claim 1, wherein said step of accessing said at least one metadata further comprises intercepting data transactions within said computer system to track object storage data.

8. The method of claim 7, wherein said object storage data is selected from a group consisting of object location data and object name data.

9. The method of claim 1, wherein said step of accessing said at least one metadata further comprises defining a stored object view by interfacing directly with said standard operating system tool to select at least one metadata field such that any metadata corresponding to said at least one metadata field and said stored object is displayed.

10. The method of claim 1, further comprising the step of searching for said stored object by supplying said standard operating system tool with said at least one metadata.

11. The method of claim 1, further comprising the step of searching for said stored object by supplying said standard operating system tool with said at least one metadata field and said at least one metadata.

12. The method of claim 1, further comprising the step of retrieving stored data corresponding to said stored object.

13. The method of claim 12, wherein the step of retrieving said stored data further comprises retrieving only a portion of said stored data, wherein said portion is based upon a resolution of an output device connected to said computer system.

14. A method for managing objects in a computer system having an operating system, said method comprising the steps of:

interfacing directly with a standard operating system tool to store at least one metadata corresponding to a stored object, wherein said standard operating system tool is an extension of said operating system's shell;

defining a profile corresponding to said stored object by a user supplying said standard operating system tool with at least one metadata field adapted to receive said at least one metadata;

supplying said standard operating system tool with said at least one metadata after said at least one metadata field has been selected; and accessing said at least one metadata corresponding to said object by interfacing directly with said standard operating system tool.

* * * * *